(12) United States Patent
Chang et al.

(10) Patent No.: US 6,912,718 B1
(45) Date of Patent: Jun. 28, 2005

(54) EVENT NOTIFICATION CHANNEL BETWEEN SUPPLIER AND CONSUMER OBJECTS IN OBJECT ORIENTED PROGRAMMING SYSTEM WITH PROXY CONSUMER OBJECTS TO MAINTAIN UNINTERRUPTED EVENT TRANSMISSION DURING CONSUMER OBJECT OFF LINE MAINTENANCE

(75) Inventors: David Yu Chang, Austin, TX (US); John Shih-Yuan Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 09/276,382

(22) Filed: Mar. 25, 1999

(51) Int. Cl.$^7$ .............................. G06F 3/00; G06F 9/44; G06F 9/46; G06F 13/00

(52) U.S. Cl. ...................... 719/318; 719/313; 719/314; 719/315; 719/316

(58) Field of Search ................................ 709/313, 314, 709/315, 316, 317

(56) References Cited

U.S. PATENT DOCUMENTS

| | | | | |
|---|---|---|---|---|
| 5,781,633 A | * | 7/1998 | Tribble et al. ................ | 380/30 |
| 5,819,281 A | * | 10/1998 | Cummins ................ | 707/103 R |
| 5,881,315 A | * | 3/1999 | Cohen ........................ | 709/202 |
| 6,182,153 B1 | * | 1/2001 | Hollberg et al. ............ | 709/315 |

* cited by examiner

Primary Examiner—Thomas Lee
Assistant Examiner—G. L. Opie
(74) Attorney, Agent, or Firm—J.B. Kraft; David A. Mims, Jr.

(57) ABSTRACT

An event notification channel is provided in a computer controlled object oriented programming system having at least one event supplier object and a plurality of event consumer objects which may be run continuously without interruption and without loss of event notification to any consumer object irrespective of whether any of the consumer objects are off line for filter modification or any other maintenance purpose. The channel transmits events from supplier objects to a plurality of filter objects, each respectively associated with one of the plurality of consumer objects for passing only selected events to the associated consumer object. The system includes a plurality of proxy consumer objects, each associated with one of said consumer objects and between said filter object and said supplier object, whereby said proxy consumer object may receive supplier transmitted events on behalf of its associated consumer object. Thus, where the actual consumer object is off line for filter modification, the proxy will remain in the system and receive the transmitted events.

14 Claims, 5 Drawing Sheets

EVENT NOTIFICATION CHANNEL BETWEEN SUPPLIER AND CONSUMER OBJECTS IN OBJECT ORIENTED PROGRAMMING SYSTEM WITH PROXY CONSUMER OBJECTS TO MAINTAIN UNINTERRUPTED EVENT TRANSMISSION DURING CONSUMER OBJECT OFF LINE MAINTENANCE

TECHNICAL FIELD

The present invention relates to user-interactive object oriented programming systems and particularly to event notification transmission between event supplier objects and event consumer objects in such object oriented programming systems.

BACKGROUND OF RELATED ART

The 1990's decade has been marked by a technological revolution driven by the convergence of the data processing industry with the consumer electronics industry. The effect has in turn driven technologies which have been known and available but relatively quiescent over the years. Two of these technologies are the Internet related distribution and object oriented programming systems. The computer and communications industries have extensively participated in the development and continual upgrading of object oriented programming systems, such as the Java system. For details and background with respect to object oriented programming systems, such as the Java programming system, C++ and others, reference may be made to some typical texts: *Just Java*, 2nd Edition, Peter van der Linden, Sun Microsystems, 1997; *Thinking in Java*, Bruce Eckel, Prentice Hall PTR, 1998; and *Objects, Components and Frameworks with UML*, Desmond F. D'Sousa et al., Addison-Wesley, 1998. The convergence of the electronic entertainment and consumer industries with data processing has exponentially accelerated the demand for wide ranging communications distribution channels and the World Wide Web (Web) or Internet, which had quietly existed for over a generation as a loose academic and government data distribution facility, reached "critical mass" and commenced a period of phenomenal expansion, which has not as yet abated.

With the expanded accessibility of hundreds of thousands of programmers, information distributors and users to each other, not to mention to potential users of such programs via the expanded Internet client base, an obvious need became apparent: cooperative program systems in a distributed programming environment. Object oriented programming offered the solution. With its potentially interchangeable objects or units within which both data attributes and functions were stored in a predefined uniform framework, as well as the predefined object interfaces with each other, object oriented programming systems have found acceptance as the programming system for the Internet. In all areas of data processing and communications, as well as the electronic entertainment and consumer industries having anything to do with the Internet, there has been a substantial movement to object oriented programming systems.

Object oriented programming systems are event driven, i.e. the event is an outgoing notification from a given component to all other registered or interested components in the programming system. In other words, there are registered observer or consumer objects in a system which have registered an interest in selected states or attribute values of subject or supplier objects. Such changes in state or attribute values cause the supplier object to broadcast a notification of this change, which constitutes an event to all registered observers or consumers. In such systems, the supplier objects may be designed or developed without any reference as to how the consumer objects operate and new consumers or observers may be added without regard to the suppliers. The notification message may contain more information or less information, i.e. events about the nature of the changes in the supplier and the observer or consumer may take place, i.e. filter out whatever details or events that it is interested in. A general recitation about the handling of events notification between producers or suppliers and consumers may be found in the above-referenced *Just Java* text at pp. 198–205. As mentioned above, the consumer objects generally use filtering objects respectively associated with the consumer objects to parse or filter out from the broadcast events transmitted from the supplier objects, those events selected by the particular consumer objects. Filter objects are described in the above text, *Just Java* at pp. 292–301.

While such event notification processes have been quite effective in the distribution of event data from a plurality of suppliers to pluralities of consumers, problems are encountered when it is desired to modify or replace the filter objects associated with particular consumers of event data or otherwise take the consumer objects "off line" during continuous runs of the event notification and distribution systems, which, because of the extensive numbers of suppliers and consumers, often seems to be continuously running. Accordingly, any interruption of the event notification system for any change is not practical.

SUMMARY OF THE PRESENT INVENTION

The present invention provides for an event notification channel for an object oriented programming system with a plurality of supplier objects and a plurality of event consumer objects which may be run continuously without interruption and without loss of event notification to any consumer object irrespective of whether any of the consumer objects are off line for filter modification or any other maintenance purpose. The event notification channel comprises means for transmitting events from supplier objects to a plurality of filter objects, each respectively associated with one of said plurality of consumer objects for passing only selected transmitted events to said one consumer object. The system includes a plurality of proxy consumer objects, each associated with one of said consumer objects and between said filter object and said supplier object, whereby said proxy consumer object may receive supplier transmitted events on behalf of its associated consumer object. Thus, when the actual consumer object is off line for filter modification, the proxy will remain in the system and receive the transmitted events. The notification channel will, preferably, further include means for distributing the events received by the proxy consumer objects respectively to the filter objects associated with said consumer objects. In order to cover the times when consumer objects may be off line as described above, the notification channel further includes means for delaying said distribution of events received by a proxy consumer object until the filter object for the consumer object associated with said proxy consumer object becomes operational. Each of the proxy consumer objects, preferably, includes a proxy input object for receiving said supplier transmitted events, and a proxy output object for holding said received events until the filter object for the consumer object associated with said proxy consumer object becomes operational. As previously mentioned, the present invention may be effectively implemented on networks such as the Web or Internet. In such a case, the notification channel object may be included in a network distribution server.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
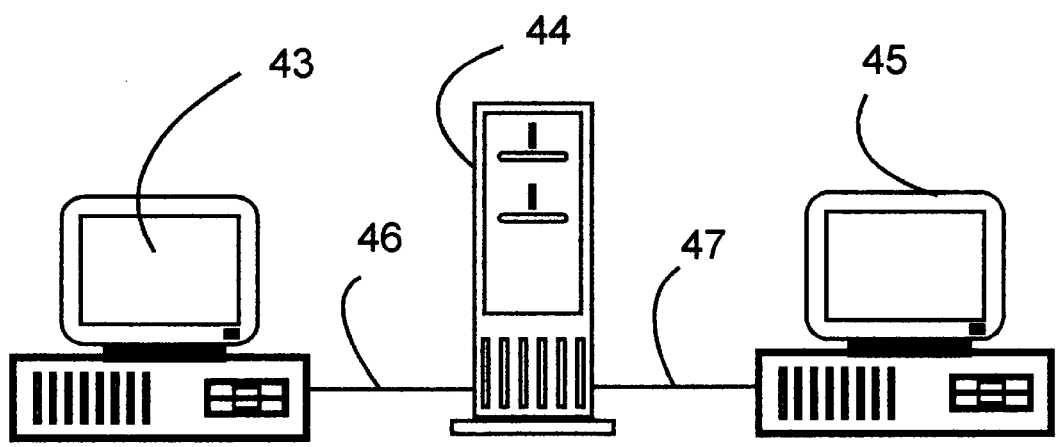
FIG. 1 is a block diagram of a generalized local network on which the present invention may be implemented.

With reference to FIG. 1 there is shown a representative diagram of a local network which may be used in the simplest illustrative hardware to implement the present invention. Interactive display computer terminal 43 contains the object oriented software providing the supplier objects which provide the events transmitted via connector 46 to server computer 44 which will contain the event notification channel object in accordance with the present invention to be subsequently described in detail. The events processed through the events notification channel object in server 44 are, in turn, transmitted over connector 47 to the receiving interactive display computer terminal 45 which contains the event consumer object which has registered interest in the received events. It is understood that there may be a plurality of such transmitting terminal 43 respectively containing event supplier objects, as well as a plurality of receiving terminals 45 respectively containing event consumer objects. Also, pluralities of supplier objects and consumer objects may include, respectively, a computer display transmitting terminal and receiving terminal 45.

Figure 2:
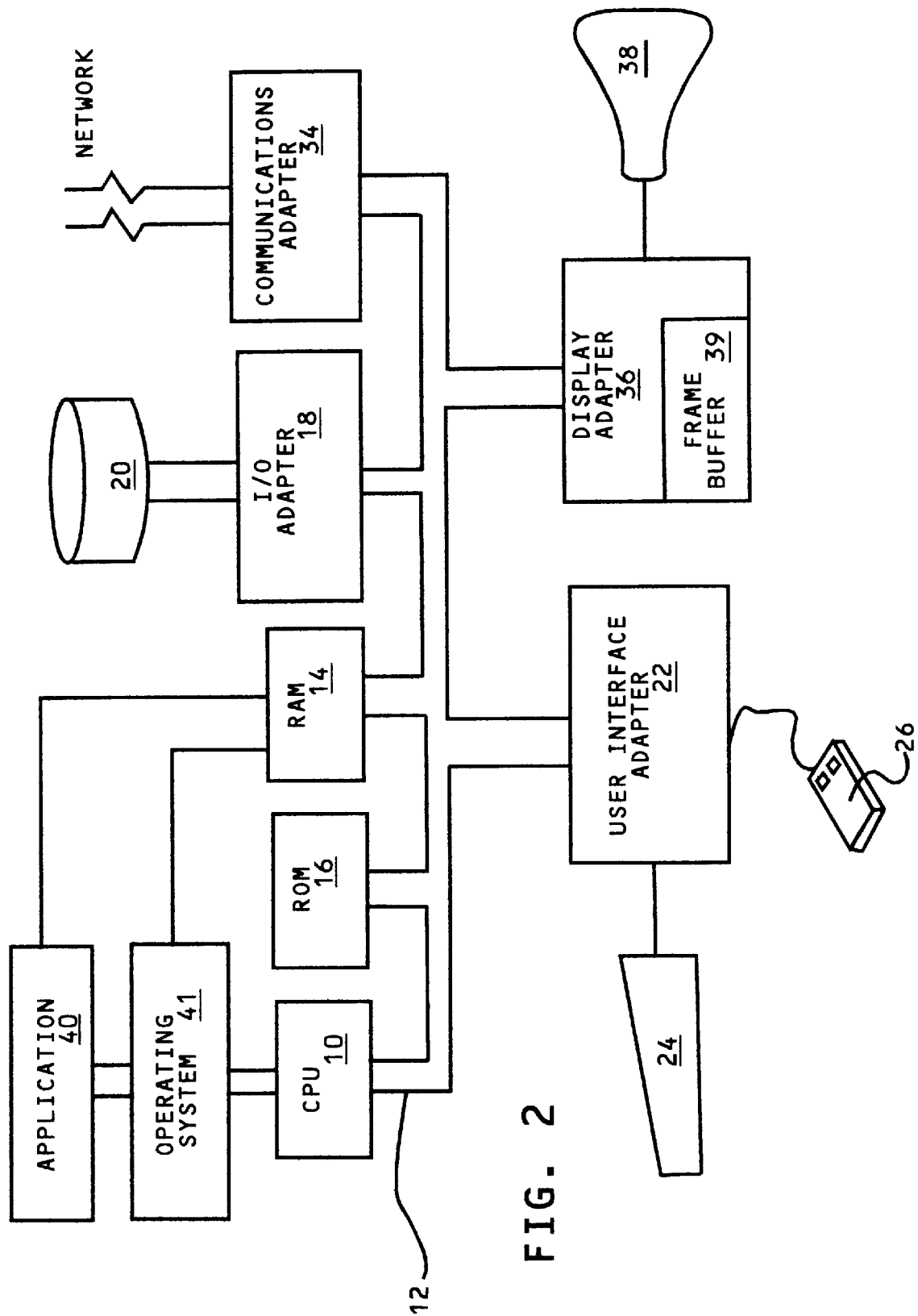
FIG. 2 is a block diagram of a generalized data processing system including a central processing unit (CPU) which may be used to provide either the computer display terminal from which the supplier object transmits events to the notification channel or the computer display terminal on which the consumer object receives events from the notification channel.

FIG. 2 shows a typical computer display terminal which may function as either transmitting terminal 43 or receiving terminal 45. A CPU 10, such as a PC microprocessors or workstations, e.g. RISC System/6000™ (RS/6000) (RISC System/6000 is a trademark of International Business Machines Corporation) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system or OS/2™ operating system available from IBM (AIX 6000 and OS/2 are trademarks of IBM); Microsoft's Windows 95™ or Windows NT™, as well as UNIX and AIX operating systems. Application programs 40, controlled by the system, are moved into and out of the main random access memory (RAM) 14. These programs include the objects manipulated in the object oriented programs of the present invention, e.g. the event supplier objects and their associated filter objects, as well as the event consumer objects and their associated filter objects. A read only memory (ROM) 16 is connected to CPU 10 via bus 12 and includes the basic input/output system (BIOS) that controls the basic computer functions. RAM 14, I/O adapter 18 and communications adapter 34 are also interconnected to system bus 12. I/O adapter 18 may be a small computer system interface (SCSI) adapter that communicates with the disk storage device 20. Communications adapter 34 interconnects bus 12 with an outside network, enabling the data processing system to communicate with other such systems over a local area network (LAN) or WAN, which includes, of course, the Web or Internet. I/O devices are also connected to system bus 12 via user interface adapter 22 and display adapter 36. Keyboard 24 and mouse 26 are all interconnected to bus 12 through user interface adapter 22. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Figure 3:
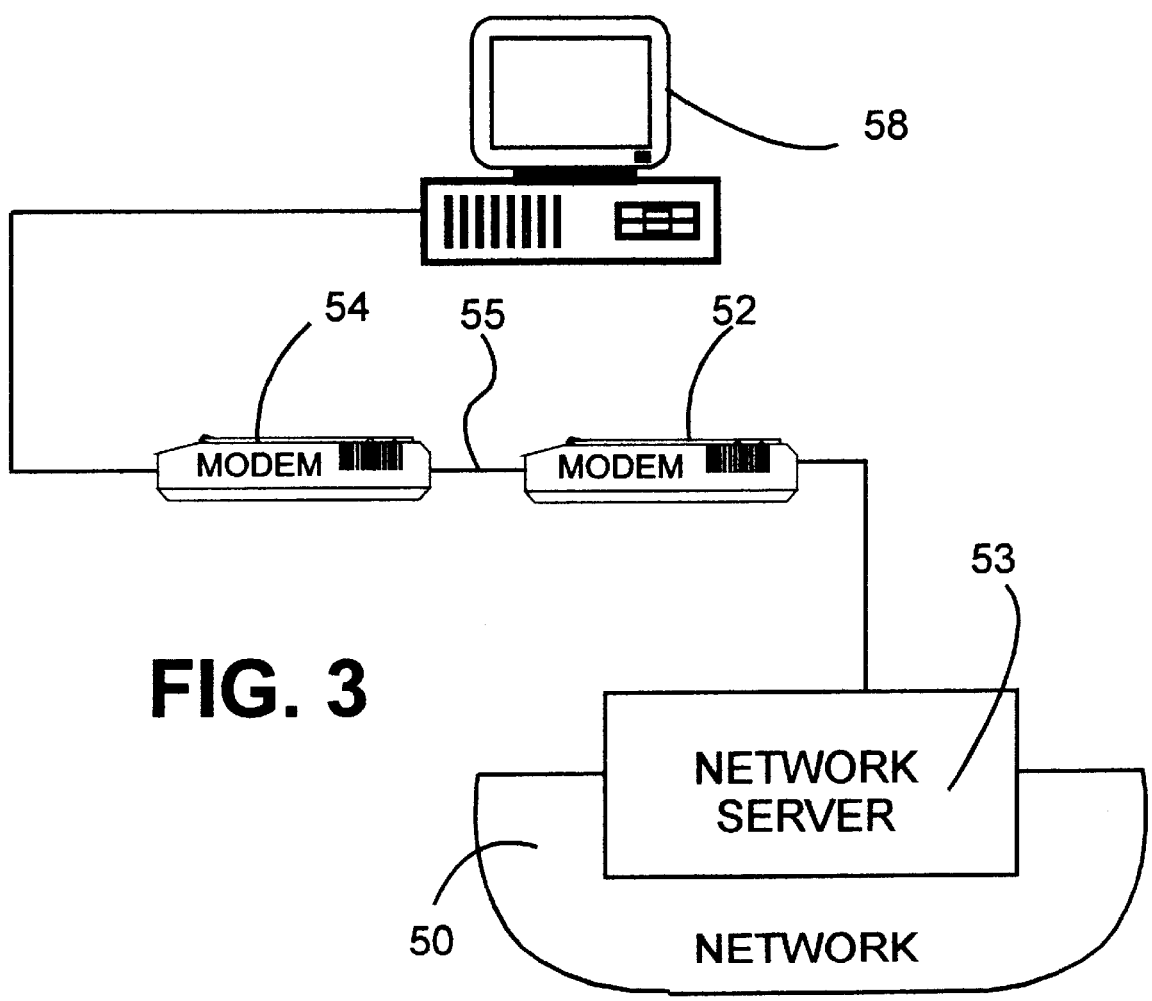
FIG. 3 is a block diagram of a generalized wide area network (WAN), such as the Internet, on which the present invention may be implemented.

Now with respect to FIG. 3, there will be described a network application of the present invention. A computer display terminal may function as either the event transmitting terminal containing the supplier objects or the event receiving terminal containing the consumer objects. For purposes of this illustration, its function will be the receiving terminal. A generalized diagram of a portion of a network such as the Internet is shown. The receiving computer controlled display terminal 58 will be used to support the consumer objects, which will be receiving their filtered events as will hereinafter be described in greater detail. Reference may be made to the text, *Mastering the Internet*, G. H. Cady et al., published by Sybex Inc., Alameda, Calif., 1996, pp. 136–147, for typical connections between local display terminals to the Internet via network servers, any of which may be used to implement and support the event notification channel portion of this invention. The system embodiment of FIG. 3 is one of these known as a host-dial connection. Such host-dial connections have been in use for over 30 years through network access servers 53 which are linked 51 to the Internet 50. The servers 53 provide network services to the client's display terminal, such as receiving terminal 58. The network server 53 is accessed by the terminal 58 through a normal dial-up telephone linkage via modem 54, telephone line 55 and modem 52. Data, including events, is downloaded to receiving terminal 58 through controlling server 58 via the telephone line linkages from server 53 which may have accessed them from the internet 50. It will be understood that in the same manner, the computer controlled display terminal may also function as an event transmitting terminal containing supplier objects. In either situation, the event notification channel of the present invention may conveniently be embodied in the network server 53.

With respect to FIG. 4, the event notification channel of the present invention will now be described. Push supplier objects 1 (71) and 2 (72) and their respective associated filter objects 86 and 87 are in the transmitting display terminals, while push consumer objects 1 (73) and 2 (74) and their respective associated filter objects 84 and 85 are in receiving display terminals. The flow of the events to the consumer objects 73 and 74 is through the event notification channel object 61. This channel may be implemented as part of any standard object request broker service, such as COBRA (Common Object Request Broker Architecture), an industry standard. For additional details on object request broker architectures, please refer to the text, *Object Technology in Application Development*, Daniel Tkach et al., Addison-Wesley Publishing, 1996, pp. 147–151. Consumer objects may register or unregister their interest in events, which are prespecified occurrences in an object which are of interest to one or more of the consumer objects. The supplier objects provide the events. Thus, supplier objects 71 and 72 provide the events transmitted via event notification channel object 61 to consumer objects 73 and 74. Channel object 61 uses standard COBRA requests in transmitting requests. The events which the supplier objects send out are respectively controlled through supplier filter objects 86 and 87, while the events which the consumer objects will selectively receive are controlled through consumer filter objects 84 and 85. The filter objects will encapsulate the constraints which will determine the events to be passed to the respective consumer object associated with the filter object. In a filter object, each encapsulated constraint has two structural components: a sequence of data structures, each of which indicates an event type made up of a domain and a type name; and, the properties of an event, expressed in constraint grammar. Some of the general principals involved in the creation of filter objects using Java programming may be found in the above-referenced *Just Java* text at pp. 92–95.

Now, within the event notification channel, there will be described the functions of the proxy consumer objects.

Each proxy consumer object includes two subobjects: the first proxy consumer object which is associated with push consumer object 1 (73) is made up of consumer proxy output object 1 (77) and consumer proxy input object 1 (75); while the second proxy consumer object which is associated with push consumer object 2 (74) is made up of consumer proxy output object 2 (78) and consumer proxy input object 2 (76). These objects permit the modification of the consumer objects without interrupting the continuous running of the notification channel. It should be noted that the proxy consumer objects are tracked and, to some extent, controlled by a supplier administrator object 63 which tracks proxy input object list 64 and consumer administrator object 62 which tracks proxy output object list 65. Consumer proxy input object 75 represents a run time interface which is the equivalent of the interface of consumer object 73 as filtered by filter 84, but at removed location interfacing with supplier object 71. Likewise, consumer proxy input object 76 represents a run time interface which is the equivalent of the interface of consumer object 74 as filtered by filter 85, but at removed location interfacing with supplier object 72. Similarly, consumer proxy output object 77 represents an interface which is the equivalent of the interface of supplier object 71 as filtered by filter 86, but at removed location interfacing with consumer object 73. Likewise, consumer proxy output object 78 represents an interface which is the equivalent of the interface of supplier object 72 as filtered by filter 87, but at removed location interfacing with consumer object 74.

The creation of proxy objects is well known in object oriented programming. One of the proxy functions is to represent object functions at locations remote from the original objects. Reference may be made to the above-mentioned D'Sousa et al. text with respect to proxies.

Figure 4:
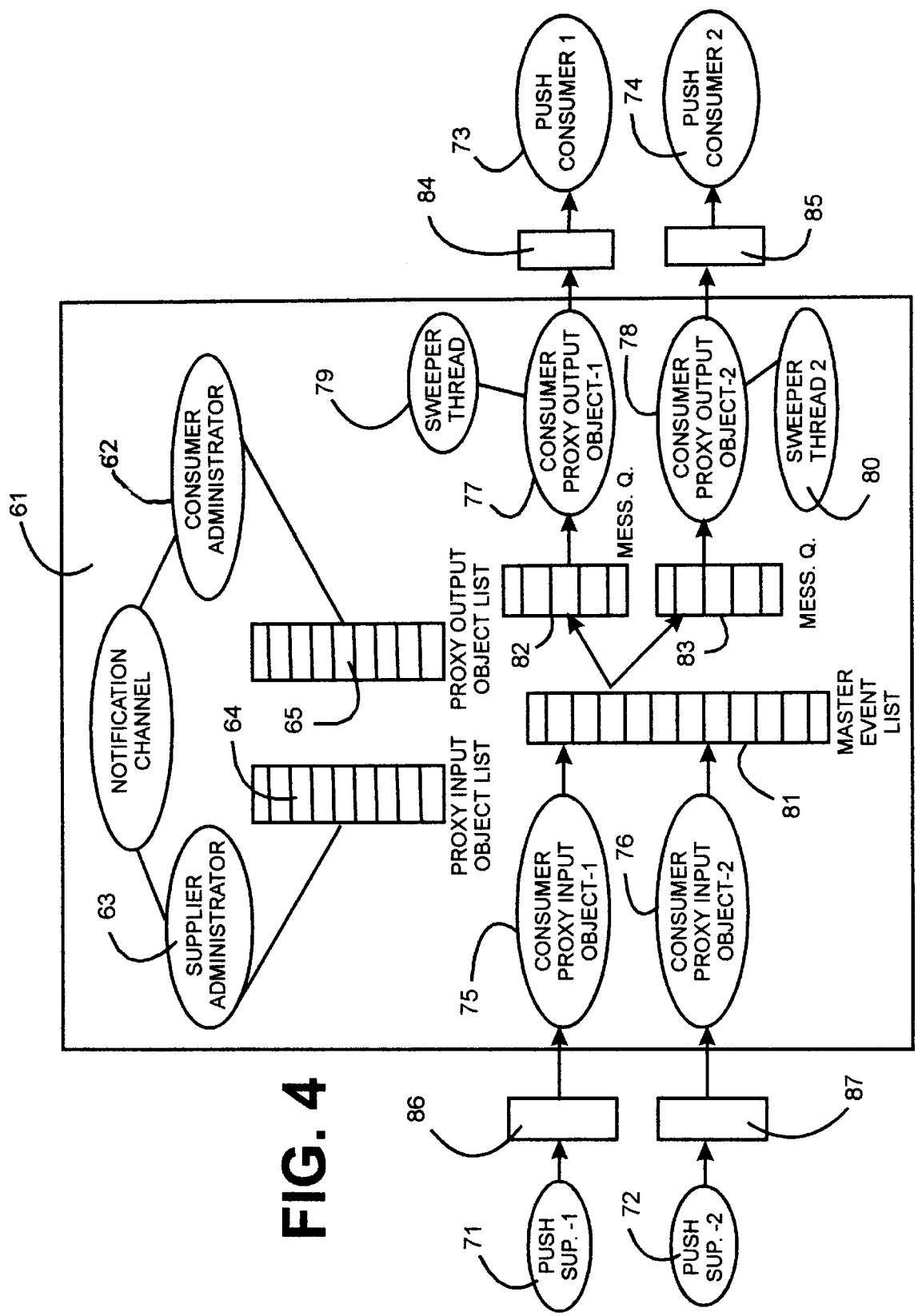
FIG. 4 is a block diagram of a generalized object oriented notification channel in accordance with the present invention.
Figure 5:
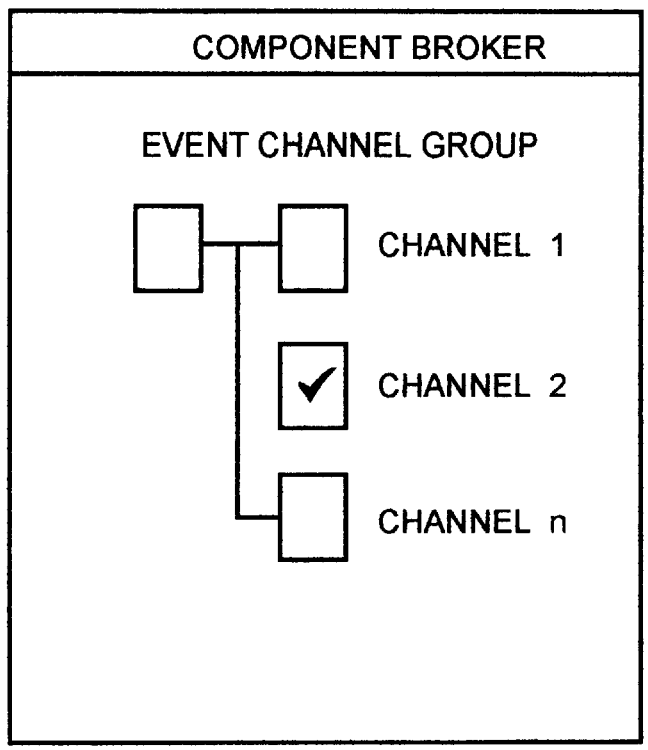
FIG. 5 is a diagrammatic illustration of part of a display screen showing an initial dialog box which may be used to make modifications in either supplier objects or consumer objects without interrupting the running of the events notification channel.
Figure 6:
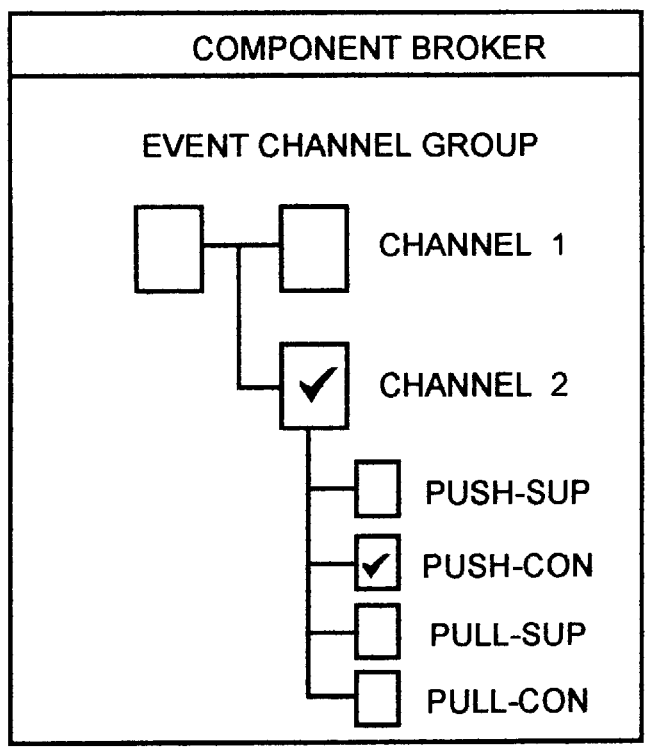
FIG. 6 is the display screen of FIG. 5 at a next stage in making modification of supplier or consumer objects.
Figure 7:
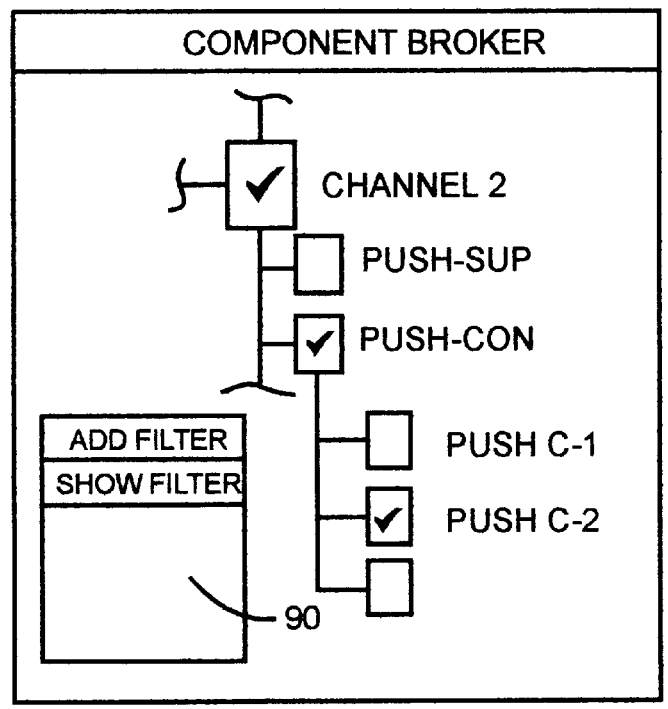
FIG. 7 is the display screen of FIG. 6 at a next stage in making modification of supplier or consumer objects.
Figure 8:
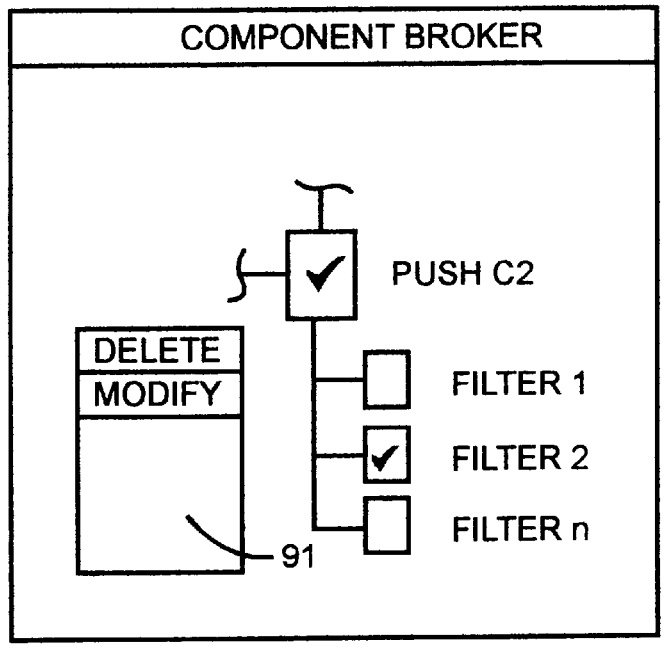
FIG. 8 is the display screen of FIG. 7 at a later stage of making such object modifications.

In accordance with this invention, if one of the consumer objects, e.g. consumer object 73, were to have its selected events modified, and, thus, object 73 and its filter were taken off line, the notification channel shown in FIG. 4 would continue its regular uninterrupted operation. The removal of the consumer object 73 and filter object 84 would be transparent to supplier object 71 and filter object 86 as they would continue to see the same filtered consumer object interface as provided by consumer proxy input object 75 which would receive the events intended for consumer object 73. These events would be passed through master event list 81 from which they would reach message queue 82. Then, when the modified push consumer object 73 and filter object 84 were put back on line, sweep thread-1, 79 would move the events from queue 82 through proxy consumer output object 77 to the modified filtered consumer object 73. It will be understood that consumer proxy input object 76, message queue 83, consumer proxy output object 78 and sweeper thread-2, 80 would perform the same functions if consumer object 74 and its associated filter 85 were to be taken off line for modification.

In this connection, it should also be noted that there is an additional benefit with respect to the need to remove a supplier object, e.g. supplier object 71 and its filter 86 for modification. This would be transparent to consumer object 73 and filter object 84 as they would continue to see the same filtered supplier object interface as provided by consumer proxy output object 77, which still provides events.

Now, with respect to FIGS. 5 through 8, which are interactive dialog screen portions which would be represented, for example, on an event consumer's terminal such as display terminal 45 in FIG. 1 or display terminal 58 in FIG. 2, there will be described a simple example of an interface sequence for the modification of the filtered events selected for a consumer object. In the dialog screen of FIG. 5, the user selects the channel in which his event consumer object to be modified is located: Channel 2. This brings up the dialog box screen of FIG. 6 from which the user selects "push-con", the push consumer object, in turn resulting in the dialog screen of FIG. 7 from which the user selects "push C-2" which represents push consumer object 2, and brings up menu 90 from which the user selects, for example, to show exiting filters. This results in the dialog of FIG. 8 from which the user selects filter 2 for modification from menu 91. This results in a filter object 2 being removed from the line, or running process, which continues to run while the selected filter object is modified as previously described.

One of the preferred implementations of the present invention is as a routine in an operating system made up of programming steps or instructions resident in RAM 14, FIG. 2, during computer operations. Until required by the computer system, the program instructions may be stored in another readable medium, e.g. in disk drive 20, or in a removable memory, such as an optical disk for use in a CD-ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a computer controlled object oriented programming system having at least one event supplier object and a plurality of event consumer objects, an event notification channel object comprising:
    means for transmitting events from said supplier object,
    a plurality of filter objects, each respectively associated with one of said plurality of consumer objects for passing only selected transmitted events to said one consumer object, and
    a plurality of proxy consumer objects, each associated with one of said consumer objects and between said filter object and said supplier object, whereby said proxy consumer object may receive supplier transmitted events on behalf of its associated consumer object.

2. The object oriented programming system of claim 1 wherein said notification channel object further includes means for distributing said events received by said proxy consumer objects respectively to the filter objects associated with said consumer objects.

3. The object oriented programming system of claim 2 wherein said notification channel further includes means for delaying said distribution of events received by a proxy consumer object until the filter object for the consumer object associated with said proxy consumer object becomes operational.

4. The object oriented programming system of claim 3 wherein each of said proxy consumer objects comprises a proxy input object for receiving said supplier transmitted events and a proxy output object for holding said received events until the filter object for the consumer object associated with said proxy consumer object becomes operational.

5. In a computer controlled object oriented-programming system network having a plurality of user-interactive display terminals and at least one event supplier object at one of said terminals and a plurality of event consumer objects respectively at a plurality of said terminals, an event notification channel object comprising:
    means for transmitting events from said supplier object,
    a plurality of filter objects, each respectively associated with one of said plurality of consumer objects for passing only selected transmitted events to said one consumer object, and
    a plurality of proxy consumer objects, each associated with one of said consumer objects and between said filter object and said supplier object, whereby said proxy consumer object may receive supplier transmitted events on behalf of its associated consumer object.

6. The object oriented programming system network of claim 5 wherein said notification channel object further includes means for distributing said events received by said proxy consumer objects respectively to the filter objects associated with said consumer objects.

7. The object oriented programming system network of claim 6 wherein said notification channel further includes means for delaying said distribution of events received by a proxy consumer object until the filter object for the consumer object associated with said proxy consumer object becomes operational.

8. In a computer implemented method of object oriented programming including supplying events from at least one supplier object to a plurality of consumer objects, a method of notifying consumer objects of supplied events comprising:
    transmitting events from said supplier object,
    for each of a plurality of consumer objects, filtering said transmitted events to pass only selected transmitted events to each object, and
    providing a plurality of proxy consumer objects, each associated with one of said consumer objects and between said filtering step and said supplier object, whereby said proxy consumer object may intercept transmitted events on behalf of its associated consumer object.

9. The method of claim 8 further including the step of providing said events intercepted by said proxy consumer objects respectively to said filtering step for each of said consumer objects.

10. The method of claim 9 further including the step of delaying said distribution of events intercepted by a proxy consumer object until the filtering step for the consumer object associated with said proxy consumer object becomes operational.

11. In a computer program having code recorded on a computer readable medium for an object oriented programming system having at least one event supplier object and a plurality of event consumer objects, an event notification channel object comprising:
    means for transmitting events from said supplier object,
    a plurality of filter objects, each respectively associated with one of said plurality of consumer objects for passing only selected transmitted events to said one consumer object, and
    a plurality of proxy consumer objects, each associated with one of said consumer objects and between said filter object and said supplier object, whereby said proxy consumer object may receive supplier transmitted events on behalf of its associated consumer object.

12. The computer program of claim 11 wherein said notification channel object further includes means for distributing said events received by said proxy consumer objects respectively to the filter objects associated with said consumer objects.

13. The computer program of claim 12 wherein said notification channel further includes means for delaying said distribution of events received by a proxy consumer object until the filter object for the consumer object associated with said proxy consumer object becomes operational.

14. The computer program of claim 13 wherein each of said proxy consumer objects comprises a proxy input object for receiving said supplier transmitted events and a proxy output object for holding said received events until the filter object for the consumer object associated with said proxy consumer object becomes operational.

* * * * *